March 14, 1939. E. H. PIRON 2,150,631
BRAKE SHOE LINKAGE
Filed July 21, 1937
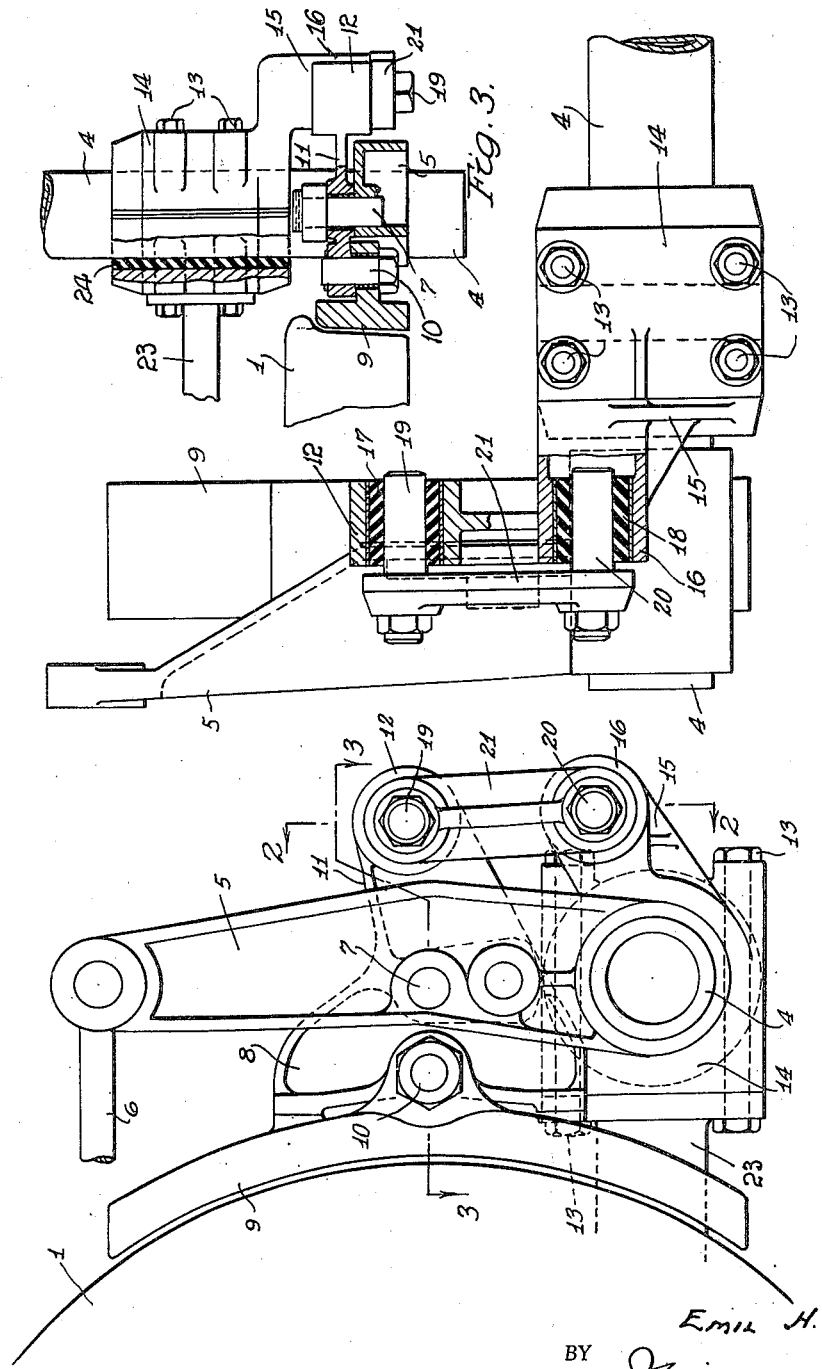
INVENTOR.
Emil H. Piron
BY
ATTORNEY.

Patented Mar. 14, 1939

2,150,631

UNITED STATES PATENT OFFICE 2,150,631

BRAKE SHOE LINKAGE

Emil H. Piron, New York, N. Y., assignor to Transit Research Corporation, New York, N. Y., a corporation of New York Application July 21, 1937, Serial No. 154,859

13 Claims. (Cl. 188—206)

This invention relates to brake linkage and has more particular application to heavy duty brakes such as are used in railroad trucks, streetcars and similar structures, having for its object to provide a form of brake linkage which will adequately meet many of the important requirements of construction and operation very desirable in the art, with simple and robust construction, easy and precise brake application and release, automatic adjustment of the angle of application of the brake shoe to meet varying conditions such, for instance, as may result from wear of the wheel tire, minimizing of lost motion or noisy operation and chattering, and the securing of a highly responsive action in the linkage to the operation of the brake rod or other brake-actuating means.

A more particular object of the invention is to effect, by the relative arrangement and proportioning of the linkage, a controlled angular movement of the brake shoe calculated to counteract any tendency towards disconformity between the arc of the shoe and the periphery of the wheel tire, such as results in parallel motion brake linkage where the shoe is moved forwardly to take up the additional clearance resulting from wear of the wheel tire or of the face of the brake shoe or of both of them as the case may be.

Still further it is an object of the invention to provide for resilience or elasticity in one or more of the joints of the linkage, as by the use of a rubber bushing or bushings, and to provide for the incorporation of such bushing or bushings in the linkage in a manner facilitating or promoting the automatic shoe adjustment referred to.

It is a still further object of the invention to incorporate in one or more of the joints of a brake linkage resilient or elastic means such as a rubber bushing or bushings, arranged to operate as or in cooperation with retractile springs tending to maintain the shoe in its released position, and also operating to apply forces to the linkage maintaining the elements thereof against rattling or the developing of lost motion.

Still further objects subsidiary to the aforesaid objects, or resulting from the construction or operation of the invention as it may be carried into effect, will become apparent as the said invention is hereinafter further disclosed.

In carrying the said invention into effect, I may provide the novel construction and arrangement of parts hereinafter described, by way of example, having reference to the accompanying drawing, wherein:

Figure 1 is a side elevation of a brake linkage embodying the said improvements;

Figure 2 is an end elevation of the same, partly in section taken on a plane indicated by the line 2—2, Figure 1; and Figure 3 is a plan of the same shown partly in section taken on a plane indicated by the line 3—3, Figure 1.

Similar characters of reference indicate similar parts in the several figures of the drawing.

1 indicates part of the wheel of a truck or vehicle and 4 a cross member of the vehicle frame, details of the said vehicle or its frame being omitted as well understood and not necessary to the description of the invention. 5 is the brake arm extending from and mounted on the end of the member 4, 6 being the brake rod by means of which the said arm is operated, as in the usual manner.

A pin 7 extending laterally from the brake arm 5 intermediate its length forms the pivot mounting for a brake shoe carrying member 8 to which the brake shoe 9 is secured by the bolt 10, this member 8 being illustrated as having a rearwardly extending portion 11 terminating in a more or less large tubular boss 12.

23 is a frame member carrying a two piece bracket member 14 the parts of which are clamped together by the bolts 13 about the cross member 4. I may interpose a rubber or similar bushing 24 between the said bracket member 14 and the said cross member 4 to yieldably resist the rotation of the said cross member in the bracket member and therefore act as a return spring for the brake as well as a resilient or elastic support for the brake linkage as a whole as will be apparent. Such a return spring, apart from the present combination, is described in my co-pending application, Serial Number 164,095, filed September 16, 1937.

The said bracket member 14 includes a rearward and upwardly extending bracket arm 15 also provided at its end portion with a tubular boss 16, similar to the boss 12, the said bosses 12 and 16 enclosing rubber or similar bushings 17 and 18, respectively, which in turn engage and form the bearings for the inner ends of pins 19 and 20, the projecting ends of which pins are coupled together by a link 21. The pins 19 and 20 are keyed or taper filled into the link 21.

Thus the construction described resembles a parallel motion brake linkage except that the pivot points do not form a true parallelogram in that the distance between the center of the pins 7 and the member 4 is greater than the distance between the centers of the pins 19 and 20, and the distance between the members 4 and 20 is greater than that between the pins 7 and 19. The centers of the members 4, 7, 19, and 20 thus define what may be considered as a pseudo-parallelogram. Consequently, in operation, the pin 7 swings through an arc of greater radius than the pin 19 which means that for a given forward movement of the arm 5 the arc of motion of the pin 19 will descend faster than the arc of motion of the pin 7. In other words, as the brake moves forwardly the pin 19 moves downwardly relative to the pin 7 causing the lower end of the shoe to move forwardly to an extent greater than does the upper end thereof.

If the motion were a true parallel one, the brake shoe while maintaining its vertical position relative to the ground would move, as a whole, in the same arc as that of the pivot 7, so that, if the center line of the brake shoe, that is, a line through the axes of pins 7 and 10, were, at the moment of contact with the wheel tire, truly directed to the axis of the wheel, this condition would not be maintained after wear had reduced the diameter of the tire or thickness of the brake shoe requiring increased motion of the brake shoe to establish contact, as this increased motion would result in downward motion of the brake shoe. The shoe remaining in its vertical relationship to the ground would contact at its upper end with the wheel instead of throughout the face of the brake shoe. This, of course, is very undesirable, resulting in uneven wear on the brake shoe and inefficient braking action as well as undue strain on various parts of the mechanism.

The described objectionable feature of true parallel motion in a brake linkage can be overcome by effecting a tilting of the brake shoe corresponding to its angular variation from the normal center line through the axis of the wheel, so that its center line will be maintained radially of the wheel and thus extended directly through the said axis irrespective of the movement of the brake shoe forwardly and downwardly relative thereto; and this I accomplish in the illustrated example by the differential spacing of the pivot points as described.

It will be apparent that, by proper proportioning of such spacing, the faster descending arc of the pin 19 relative of the pin 7 may cause the tilting of the brake shoe about the axis of the said pin 7 to the extent required to bring the shoe into even contact throughout its length with the periphery of the wheel tire, irrespective of the lowering of the shoe as a whole below the center line of the wheel, when forward motion of the shoe is increased such as to take up tire wear or brake shoe wear.

A very desirable feature of the brake linkage, which is not necessarily limited to the precise form shown as it is equally applicable whether the linkage be parallel or otherwise, utilizes resilient or elastic bearings in one or more of the link connections, the resiliency or elasticity of which may be availed of partially or solely to effect the retraction of the brake shoe and to provide silence, efficiency of action and freedom from looseness or lost motion in the mechanism; and, in the illustrated example, the bushings 17 and 18 perform these functions, the said bushings being secured to their respective bosses and pins in any suitable manner such as by any of the bonding means now well known in the rubber working art, the particular nature of which is not a feature of this invention.

It will be understood that the said bushings may be in a state of torque having a constant tendency to withdraw the brake shoe from the wheel, and limited in such effort as by movement limitations which may be imposed on the brake rod 6 or other member in the usual manner, and that the said state of torque may be effected by the assembling of the parts with the brake shoe much further removed from the wheel than its normal position of rest, whereby the adjustment through the brake rod of the brake arm 5 to bring the brake shoe to its normal position of rest will wind up the resilient or elastic bushings to some extent and provide the necessary retractile force.

Such constant unwinding effort on the part of the bushings has a marked tendency to secure the parts of the mechanism against rattling with respect to the members 4, 7, 19 and 20 and deprive them of lost motion.

This invention may be developed within the scope of the following claims without departing from the essential features of the said invention and it is desired that this specification and drawing be read as being merely illustrative and not in a limiting sense, except as necessitated by the prior art.

What I claim is:

1. In a brake linkage, in combination, a swingable brake arm, a rockable member pivoted intermediate its length on said arm, a brake shoe on the front end of said member, and means imparting an arcuate movement to the rear end of said member of shorter radius and greater amplitude but in the same direction as the arcuate movement of the pivotal point of said member when said brake arm is operated.

2. In a brake linkage, a brake carrying member, a link controlling movement of said member, and brake retracting means in the form of an elastic bearing for said link subject to torsional strain when said member is operated to apply the brake.

3. In a brake linkage, a brake carrying member, a bracket member, a link connection between said members, and brake retracting means in the form of elastic bearings connecting said link with said members and subject to torsional strain when said linkage is operated to apply the brake.

4. In a brake linkage, a brake carrying member, a link controlling movement of said member, and an elastic bearing in a state of torsion for said link imparting a brake retracting force to said member.

5. In a brake linkage, a brake carrying member, a bracket member, a link connection between said members, and elastic connecting bearings in a state of torsion between the ends of said link and each of said members imparting a brake retracting force to said member.

6. In a brake linkage, in combination, a brake carrying member, means moving said member forwardly in an arcuate path, a link engaging the rear end of said member, said link swinging in a smaller arc than said member whereby the brake carrying end of said member is rotated away from the arcuate path of said member, and an elastic connecting bearing between said link and said member.

7. In a brake linkage, in combination, a brake carrying member, means moving said member forwardly in an arcuate path, a link engaging the rear end of said member, said link swinging in a smaller arc than said member whereby the brake carrying end of said member is rotated away from the arcuate path of said member, and a brake retracting member in the form of an elastic bearing connecting said link to said member and subject to torsional strain when said member is operated to apply the brake.

8. In a brake linkage, in combination, a brake carrying member, means moving said member forwardly in an arcuate path, a link engaging the rear end of said member, said link swinging in a smaller arc than said member whereby the brake carrying end of said member is rotated away from the arcuate path of said member, and an elastic connecting bearing in a state of torsion between said link and said member imparting a brake retracting force to said member.

9. In a brake linkage, in combination, a brake shoe carrying member, a swingable link supporting the forward part of said member, a second swingable link supporting the rear part of said member, the radius of the last mentioned link being shorter than that of the first mentioned link and brake retracting means in the form of an elastic bearing subject to torsional strain for at least one of said links.

10. In a brake linkage, in combination, a brake shoe carrying member, a swingable link supporting the forward part of said member, a second swingable link supporting the rear part of said member, the radius of the last mentioned link being shorter than that of the first mentioned link, and an elastic bearing in a state of torsion for at least one of said links imparting a brake retracting force to said member.

11. In a brake linkage, in combination, a fixed bracket member, a brake carrying member swingably mounted in said bracket member, elastic means in said bracket member offering torsional resistance to the swinging of said brake carrying member, a link connecting said members, and elastic bearings connecting said link with said members.

12. In a brake linkage, in combination, a fixed bracket member, a brake carrying member swingably mounted in said bracket member, elastic means in said bracket member offering torsional resistance to the swinging of said brake carrying member, and an elastic connecting bearing for said link.

13. In a brake linkage, in combination, a fixed bracket member, a brake carrying member swingably mounted in said bracket member, elastic means in said bracket member offering torsional resistance to the swinging of said brake carrying member, a link controlling movement of said brake carrying member, and additional brake retracting means in the form of an elastic bearing for said link subject to torsional strain when said brake carrying member is operated to apply the brake.

EMIL H. PIRON.